A. LA BRECHE.
POULTRY INSECTICIDE APPLICATOR.
APPLICATION FILED APR. 17, 1917.

1,259,416.

Patented Mar. 12, 1918.

WITNESSES
Jas. K. McCathran
Howard D. Orr

INVENTOR
Alphonse La Breche,
BY
E. G. Siggers
ATTORNEY

UNITED STATES PATENT OFFICE.

ALPHONSE LA BRECHE, OF JEFFERSON, SOUTH DAKOTA.

POULTRY INSECTICIDE-APPLICATOR.

1,259,416.  Specification of Letters Patent. Patented Mar. 12, 1918.

Application filed April 17, 1917. Serial No. 162,620.

*To all whom it may concern:*

Be it known that I, ALPHONSE LA BRECHE, a citizen of the United States, residing at Jefferson, in the county of Union and State of South Dakota, have invented new and useful Poultry Insecticide-Applicators, of which the following is a specification.

This invention relates to devices for applying insecticide to poultry.

The primary object of the invention is to provide a device of this character which is adapted to be applied in position upon a drinking fountain or food container for poultry, whereby, when the latter comes to partake of the contents thereof, a sufficient quantity of the insecticide is automatically applied to the heads of the poultry, to cause the extermination of mites, etc., which are known to congregate in great numbers upon the tops of the heads of poultry where they are unable to dislodge them, often resulting, especially in the case of young chicks, in the loss of great numbers.

Another object of the invention is to provide a device for the application of insecticide to poultry composed of few parts, which are easily constructed, thus rendering the device capable of manufacture at a low cost, and which may be readily adjusted upon the fountain or food container to adapt the same for use upon full grown poultry or young chicks, as desired, and which may be easily removed from its support for the purpose of replenishing the supply of insecticide or other purposes.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the claims appended hereto.

In the drawing, in which like reference characters designate corresponding parts in each of the several figures:—

Figure 1:
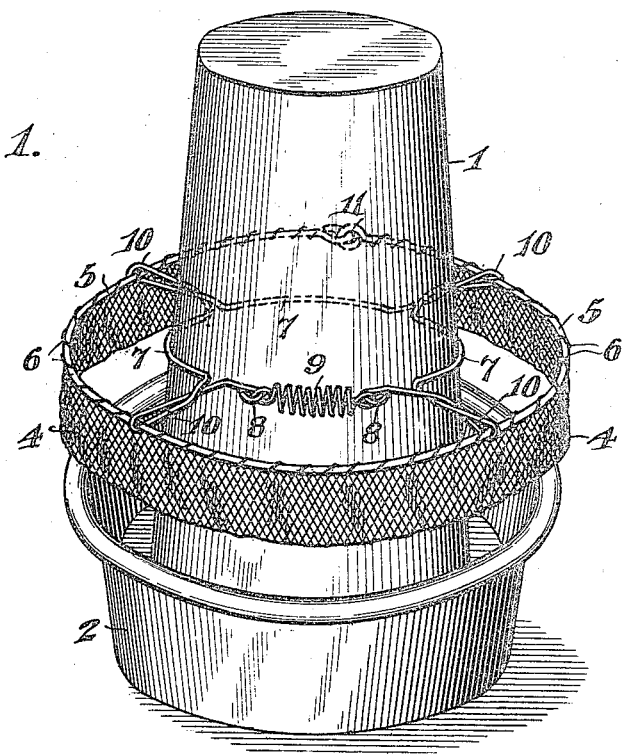
Figure 1 is a perspective view of a drinking fountain for poultry, having the improved device applied thereto.
Figure 2:
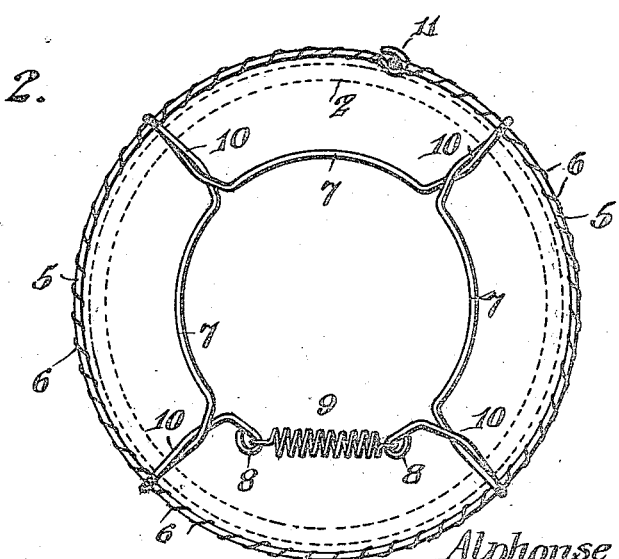
Fig. 2 is a top plan view of the device removed from the fountain, showing the pan of the drinking fountain in dotted lines.

The drinking fountain shown in Fig. 1 of the drawing is of a well-known type, to be found upon the market, and includes an upwardly tapered hollow cylindrical upstanding reservoir 1, suitably constructed for the purpose of replenishing the supply of water to the receptacle 2, which is in the form of a circular pan considerably larger in diameter than the base of the reservoir 1 concentrically located therein.

Since this structure forms no part of the present invention, no attempt has been made to fully illustrate the same.

The invention herein consists primarily in a flexible wick 4, composed of some absorbent material capable of being immersed in suitable insecticide and for holding a quantity of the same a considerable length of time.

The wick 4, which may be formed by cutting a suitable length of material and sewing or otherwise securing the ends together to form a circular band somewhat larger than the diameter of the pan 2, is supported in spaced relation to the reservoir 1 and elevated a sufficient distance above the edge of the pan, to come into contact with the heads of the poultry when they drink from the pan 2.

In order to support the wick 4 in the required position, a ring 5 of even diameter with the wick 4, and formed of stout wire is secured to the upper edge of the latter, as by stitching 6, or otherwise and serves to hold the wick in distended position. An open inner ring 7, composed also of wire, and of a diameter to snugly embrace the tapered reservoir 1, is provided with terminal eyes 8, to which are hooked the ends of a coiled spring 9, for the purpose of drawing the ends of the open ring 7 toward each other to cause the latter to hug the reservoir at any point along its height.

The inner ring 7 is provided with a plurality of out-standing spacing arms 10, in the form of loops formed in the wire, and through which the outer ring 5 is passed, after which the ends of the wire forming said ring are secured together, as indicated at 11, when the several parts of the device are securely fastened together and there is no danger of the parts becoming separated. The particular construction or formation of the loops constituting the arms 10 permits a slight expansion of the inner ring 7 for the proper fitting thereof upon the reservoir.

From the foregoing, it will be seen that a simple, durable and efficient device has been constructed, which will effectually support a wick saturated with insecticide at any desired elevation upon the fountain and in a position to wipe the heads of poultry as they lower and raise their heads in drinking from the pan 2.

When the supply of insecticide within the wick 4 becomes exhausted, it is only necessary, in order to replenish the same, to remove the device, in its entirety, from the reservoir 1, by expanding the ring 7 against the tension of the spring 9 and saturate the wick 4 in insecticide and replace the device in position again at the desired elevation upon the said reservoir. Should any of the insecticide drip from the wick, it will fall outside of the pan 2 for the reason that it is of larger diameter than said pan.

What is claimed is:—

1. A device for automatically applying insecticide to the heads of poultry, comprising inner and outer rings, arms connecting the rings, means carried by the inner ring for permitting the snug fitting thereof upon a support, and freely flexible absorbent material arranged in cylindrical form carried by the outer ring in depending relation thereto and adapted to be saturated with the insecticide, the rings and arms being in substantially the same horizontal plane with each other.

2. In combination with a drinking fountain or food container having an upwardly tapered reservoir and a pan, of a ring of greater diameter than the pan, a flexible cylindrical wick hung to depend from the ring with its lower edge free and in juxtaposition to the edge of the pan, and resilient means connected to said ring and adapted to be fitted to said reservoir for clamping the same to support the ring and wick in proper position relative to the pan.

3. The combination with a drinking fountain or food container for poultry, of an open inner ring having radial arms, a retractile spring connected with the ends of the ring for drawing the same toward each other for tensioning the same to cause snug adjustment thereof upon the fountain or container, an outer ring carried by the radial arms, and a substantially cylindrical wick secured to and depending from the outer ring in a position to contact with the heads of poultry while drinking or feeding from the fountain or container.

4. A device of the character described, comprising a pair of rings of different diameters, each made from a single length of wire, the smaller ring being located within the larger ring, and in substantially the same horizontal plane therewith, connections between the two rings, the inner ring having resilient means for tensioning the same, and a flexible substantially cylindrical shaped wick secured to depend edgewise to the outer ring and adapted to hold insecticide.

5. An applicator of the character described, comprising a split ring formed from a single length of wire bent at intervals to provide outwardly extending radial arms which are slightly expansible with the ring, an outer closed ring mounted on said arms concentrically of the first-named ring, a coiled spring connecting the ends of the split ring, and a freely flexible wick coextensive with and connected at its upper edge to the outer ring.

In testimony that I claim the foregoing as my own, I have hereto affixed my signature in the presence of two witnesses.

ALPHONSE LA BRECHE.

Witnesses:
E. E. WENNER,
JAMES WALSH.